US011942707B2

(12) United States Patent
Chan et al.

(10) Patent No.: US 11,942,707 B2
(45) Date of Patent: Mar. 26, 2024

(54) DUAL-POLARIZED ANTENNA AND DUAL-POLARIZED ARRAY ANTENNA

(71) Applicant: City University of Hong Kong, Hong Kong (HK)

(72) Inventors: Chi Hou Chan, Hong Kong (HK); Manting Wang, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 145 days.

(21) Appl. No.: 17/849,684

(22) Filed: Jun. 26, 2022

(65) Prior Publication Data

US 2023/0420853 A1 Dec. 28, 2023

(51) Int. Cl.

*H01Q 9/04* (2006.01)
*H01Q 1/48* (2006.01)
*H01Q 21/06* (2006.01)

(52) U.S. Cl.

CPC ............... *H01Q 9/045* (2013.01); *H01Q 1/48* (2013.01); *H01Q 21/065* (2013.01)

(58) Field of Classification Search

CPC ...... H01Q 1/38–48; H01Q 9/04; H01Q 21/00; H01Q 21/065

See application file for complete search history.

(56) References Cited

U.S. PATENT DOCUMENTS

| | | | | |
|---|---|---|---|---|
| 7,688,265 | B2 | 3/2010 | Irion, II et al. | |
| 8,325,093 | B2 * | 12/2012 | Holland | H01Q 21/26 343/700 MS |
| 10,205,226 | B2 | 2/2019 | Li | |
| 10,431,877 | B2 | 10/2019 | Varnoosfaderani et al. | |
| 11,431,110 | B2 * | 8/2022 | Aviv | H01Q 21/28 |
| 2014/0266922 | A1 | 9/2014 | Jin et al. | |
| 2017/0062940 | A1 | 3/2017 | Cao | |
| 2019/0089069 | A1 | 3/2019 | Niroo et al. | |

* cited by examiner

*Primary Examiner* — Hasan Islam
(74) *Attorney, Agent, or Firm* — Idea Intellectual Limited; Margaret A. Burke; Sam T. Yip

(57) ABSTRACT

An antenna includes, from top to bottom and bonded together, an upper substrate, a bonding film, a ground plane and a lower substrate. A parasitic patch arrangement and two pairs of radiator arms associated therewith are arranged on an upper surface of the upper substrate. One radiator arm pair are responsive to a differential signal received through respective vias, which extend through the upper substrate, and respective feed lines, which are arranged on a lower surface of the upper substrate, to emit a first radio frequency signal. The other radiator arm pair are responsive to another differential signal received through respective vias, which extend through the substrates, and respective feed lines, which are arranged on a lower surface of the lower substrate, to emit a second radio frequency signal orthogonal to the first radio frequency signal. A gap between one radiator arm pair intersects that between the other pair.

19 Claims, 12 Drawing Sheets

(c)

(d)

DUAL-POLARIZED ANTENNA AND DUAL-POLARIZED ARRAY ANTENNA

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a dual-polarized antenna and a dual-polarized array antenna. More specifically the present invention relates to a differentially-fed dual-polarized antenna, a differentially-fed dual-polarized array antenna, and an array antenna arrangement.

BACKGROUND OF THE INVENTION

Dual-polarized antennas are used in various telecommunication systems (e.g., 4G, WIMAX and 5G) to improve channel capacity and to realize compact designs. Aperture efficiency and aperture size are two key factors in the design of such antennas. In the case where the physical aperture of an antenna remains fixed or unchanged, the aperture efficiency of the antenna depends on the uniformity of the E-field of the aperture. In the case where the physical aperture of a printed patch array antenna remains unchanged, the antenna gain may be improved by several techniques, including adding stacking elements, introducing high-order modes, and implementing a shared aperture. However, these techniques suffer from several drawbacks. In particular, known techniques of shared aperture are applicable only to antenna designs with large frequency ratios. These known techniques of shared aperture are thus unsuitable for use in compact antenna designs. Further, known dual-polarized antennas have poor performances in terms of bandwidth, radiation pattern, gain, and cross-polarization.

SUMMARY OF THE INVENTION

It is an objective of the present invention to solve or ameliorate at least one of the aforementioned technical problems.

In accordance with a first aspect of the present invention, there is provided a differentially-fed dual-polarized antenna.

In accordance with one embodiment of the present invention, a differentially-fed dual-polarized antenna comprises: an upper substrate and a lower substrate; a bonding film bonding the upper substrate to the lower substrate; a ground plane arranged between the bonding film and the lower substrate, a parasitic patch arrangement arranged on an upper surface of the upper substrate; first and second radiator arms arranged on the upper surface of the upper substrate, operably coupled with the parasitic patch arrangement, spaced apart by a first gap, and responsive respectively to complementary components of a first differential signal to emit a first radio frequency signal having a first polarization characteristic; first and second vias extending from the upper surface of the upper substrate to a lower surface of the upper substrate, the first via connected electrically to a distal end of the first radiator arm distal from the second radiator arm, the second via connected electrically to a distal end of the second radiator arm distal from the first radiator arm; first and second feed lines arranged on the lower surface of the upper substrate, connected electrically and respectively to the first and second vias, and adapted to respectively receive the complementary components of the first differential signal; third and fourth radiator arms arranged on the upper surface of the upper substrate, operably coupled with die parasitic patch arrangement, spaced apart by a second gap intersecting the first gap, and responsive respectively to complementary components of a second differential signal to emit a second radio frequency signal having a second polarization characteristic orthogonal to the first polarization characteristic; third and fourth vias extending from the upper surface of the upper substrate to a lower surface of the lower substrate, the third via connected electrically to a distal end of the third radiator arm distal from the fourth radiator arm, the fourth via connected electrically to a distal end of the fourth radiator arm distal from the third radiator arm; and third and fourth feed lines arranged on the lower surface of the lower substrate, connected electrically and respectively to the third and fourth vias, and adapted to respectively receive the complementary components of the second differential signal.

In accordance with a second aspect of the present invention, there is provided a differentially-fed dual-polarized array antenna.

In accordance with one embodiment of the present invention, a differentially-fed dual-polarized array antenna comprises: an upper substrate and a lower substrate, a bonding film bonding the upper substrate to the lower substrate; a ground plane arranged between the bonding film and the lower substrate; a plurality of antenna portions each including: a parasitic patch arrangement arranged on an upper surface of the upper substrate; first and second radiator arms arranged on the upper surface of the upper substrate, operably coupled with the parasitic patch arrangement, spaced apart by a first gap, and responsive respectively to complementary components of a first differential signal to emit a first radio frequency signal having a first polarization characteristic; first and second vias extending from the upper surface of the upper substrate to a lower surface of the upper substrate, the first via connected electrically to a distal end of the first radiator arm distal from the second radiator arm, the second via connected electrically to a distal end of the second radiator arm distal from the first radiator arm; third and fourth radiator arms arranged on the upper surface of the upper substrate, operably coupled with the parasitic patch arrangement, spaced apart by a second gap intersecting the first gap, and responsive respectively to complementary components of a second differential signal to emit a second radio frequency signal having a second polarization characteristic orthogonal to the first polarization characteristic, and third and fourth vias extending from the upper surface of the upper substrate to a lower surface of the lower substrate, the third via connected electrically to a distal end of the third radiator arm distal from the fourth radiator arm, the fourth via connected electrically to a distal end of the fourth radiator arm distal from the third radiator arm; first and second feed network segments arranged on the lower surface of the upper substrate, connected electrically and respectively to the first and second vias of each antenna portion, and adapted to respectively receive the complementary components of the first differential signal; and third and fourth feed network segments arranged on the lower surface of the lower substrate, connected electrically and respectively to the third and fourth vias of each antenna portion, and adapted to respectively receive the complementary components of the second differential signal.

In accordance with a third aspect of the present invention, there is provided a array antenna arrangement.

In accordance with one embodiment of the present invention, an array antenna arrangement comprises a substrate surface; and first and second antenna portions each including: a parasitic patch arrangement arranged on the substrate surface; first and second radiator arms arranged on the substrate surface, operably coupled with the parasitic patch arrangement, spaced apart by a first gap, and responsive respectively to complementary components of a first differential signal to emit a first radio frequency signal having a first polarization characteristic, and third and fourth radiator arms arranged on the substrate surface, operably coupled with the parasitic patch arrangement, spaced apart by a second gap intersecting the first gap, and responsive respectively to complementary components of a second differential signal to emit a second radio frequency signal having a second polarization characteristic orthogonal to the first polarization characteristic; the first radiator arm of the first antenna portion and the second radiator arm of the second antenna portion being arranged proximate to and operably coupled with each other, and being responsive to the respective complementary components of the first differential signal to emit the first radio frequency signal.

BRIEF DESCRIPTION OF THE DRAWINGS

Embodiments of the invention are described in more details hereinafter with reference to the drawings, in which.

DETAILED DESCRIPTION

In the following description, antennas, array antennas, array antenna arrangements and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance with a first aspect of the present invention, there is provided a differentially-fed dual-polarized antenna.

Figure 1:
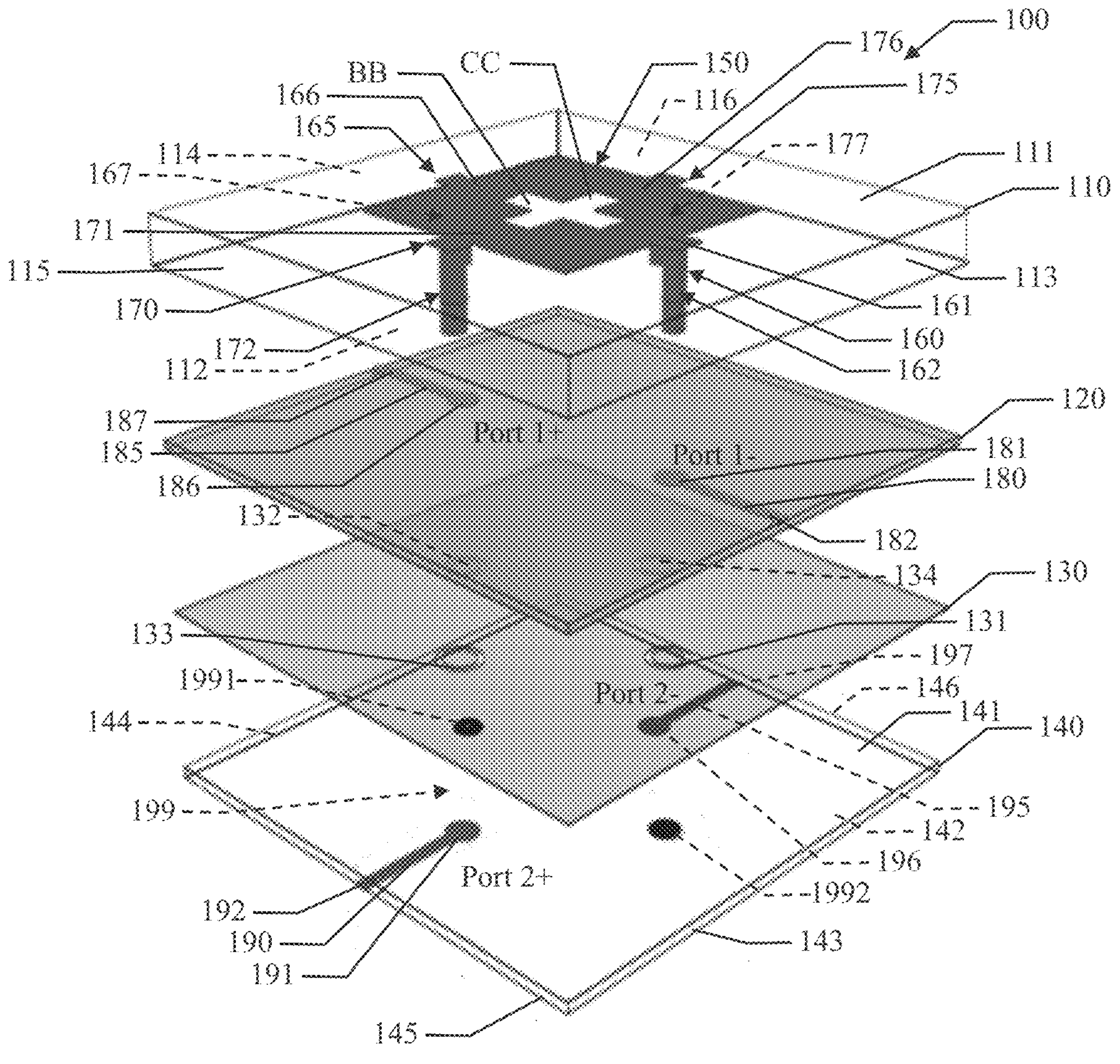
FIG. 1 depicts an exploded, partially transparent perspective view of a differentially-fed dual-polarized antenna according to one embodiment of one aspect of the present invention.
Figure 2:
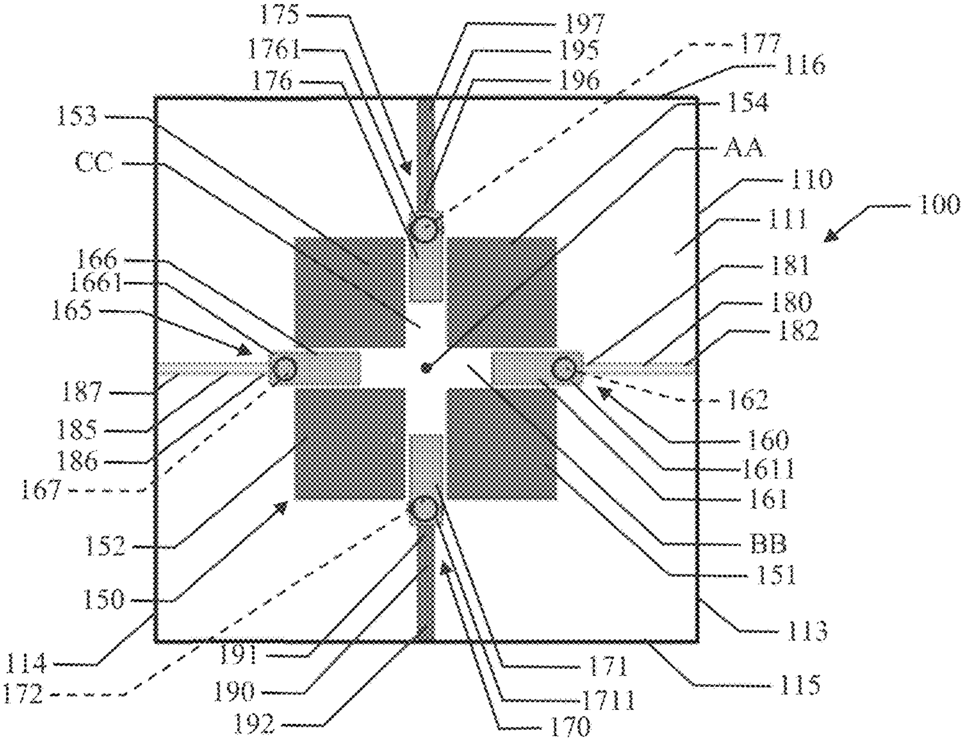
FIG. 2 depicts a top view of the antenna of FIG. 1.
Figure 3:
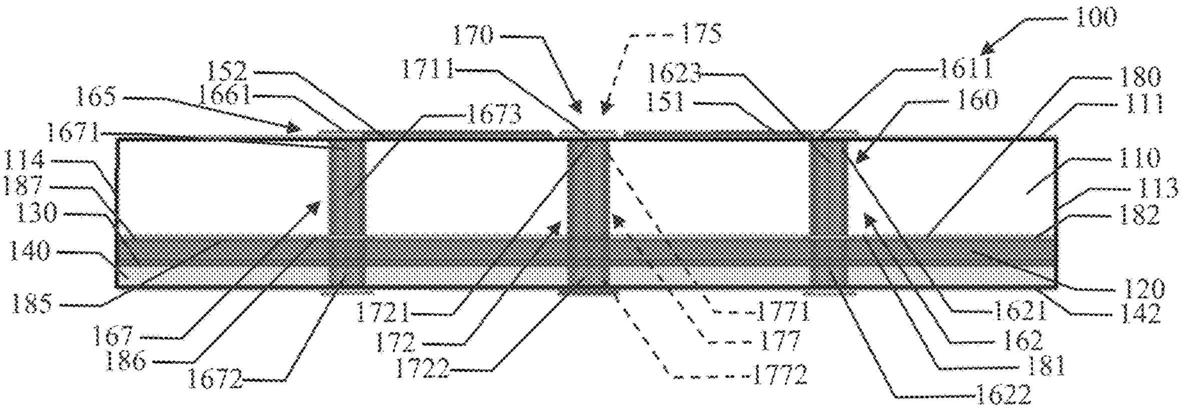
FIG. 3 depicts a transparent side view of the antenna of FIG. 1.

In accordance with one embodiment of the present invention, the deferentially-fed dual-polarized antenna 100 as shown in FIGS. 1 to 3 includes an upper substrate 110, a bonding film 120, a ground plane 130, a lower substrate 140, a parasitic patch arrangement 150, first and second L-shaped structures 160, 165, third and fourth L-shaped structures 170, 175, first and second feed lines 180, 185, third and fourth feed lines 190, 195, and an impedance matching arrangement 199. The feed lines 180, 185, 190, 195 in this embodiment are respective microstrip lines.

The upper substrate 110, the bonding film 120, the ground plane 130 and the lower substrate 140 are arranged at respective planes perpendicular to a vertically extending central axis (marked by 'AA' only in FIG. 2) and are arranged such that the central axis extends through respective centers of the upper substrate 110, the bonding film 120, the ground plane 130 and the lower substrate 140.

The bonding film is 120 is arranged between the upper substrate 110 and the lower substrate 140, and bonds the upper substrate 110 to the lower substrate 140. Further, the ground plane 130 is arranged between the bonding film 120 and the lower substrate 140. That is, the upper substrate 110 and the lower substrate 140, together with the ground plane 130, are bonded together by the bonding film 120. The bonding film 120 and the ground plane 130 are thus sandwiched between the upper substrate 110 and the lower substrate 140. The upper substrate 110 has an upper surface 111 and a lower surface 112 opposite to the upper surface 111.

The parasitic patch arrangement 150 is arranged on the upper surface 111 of the upper substrate 110 and includes four square parasitic patches 151-154. In this embodiment, the parasitic patches 151-154 are identical in dimensions and are arranged in a matrix formation. Thus, respective centers of the parasitic patches 151-154 are arranged equidistantly and equiangularly with respect to a reference point of the upper surface 111 of the upper substrate 110. In this embodiment, the reference point of the upper surface 111 intersects the central axis and serves as a center point of the matrix formation of the parasitic patches 151-154.

The first and second L-shaped structures 160, 165 include first and second radiator arms 161, 166, respectively. The first and second radiator arms 161, 166 are arranged on the upper surface 111 of the upper substrate 110, are operably coupled with the parasitic patch arrangement 150, are spaced apart by an elongated first gap (marked by BB'), and are responsive to a first differential signal to emit a first radio frequency signal having a first polarization characteristic. More particularly, the first and second radiator arms 161, 166 are responsive respectively to complementary positive and negative components of the first differential signal to cooperatively emit the first radio frequency signal. That is, the complementary components of the first differential signal have the same amplitude and are out of phase (i.e., having a phase difference of 180°) with respect to each other.

The third and fourth L-shaped structures 170, 175 include third and fourth radiator arms 171, 176, respectively. The third and fourth radiator arms 171, 176 are arranged on the upper surface 111 of the upper substrate 110, are operably coupled with the parasitic patch arrangement 150, are spaced apart by an elongated second gap (marked by 'CC') intersecting the first gap, and are responsive to a second differential signal to emit a second radio frequency signal having a second polarization characteristic orthogonal to the first polarization characteristic. More particularly, the third and fourth radiator arms 171, 176 are responsive respectively to complementary positive and negative components of the second differential signal to cooperatively emit the second radio frequency signal. That is, the complementary components of the second differential signal have the same amplitude and are out of phase (i.e., having a phase difference of 180°) with respect to each other.

The first to fourth radiator arms 161, 166, 171, 176 are elongated in shape, are arranged equidistantly and equiangularly with respect to the reference point of the upper surface 111 (i.e., the center point of the matrix formation of the parasitic patches 151-154), and extend radially and outwardly with respect to the reference point of the upper surface 111. Each of the first to fourth radiator arms 161, 166, 171, 176 is substantially interposed between a respective adjacent pair of the parasitic patches 151-154, and extends longitudinally beyond the respective adjacent pair of the parasitic patches 151-154 in a radial direction away from the reference point of the upper surface 111 of the upper substrate 110.

The first and second L-shaped structures 160, 165 further include first and second vias 162, 167, respectively. Each of the first and second vias 162, 167 extends vertically with respect to and through the upper substrate 110, the bonding film 120, the ground plane 130 and the lower substrate 140, and has a respective upper end 1621, 1671 connected electrically to a distal end 1611, 1661 of the corresponding radiator arm 161, 166, with the distal end 1611, 1661 of the corresponding radiator arm 161, 166 being distal from the reference point of the upper surface 111. That is, the distal end 1611 of the first radiator arm 161 is arranged distal from the second radiator arm 166, and the distal end 1661 of the second radiator arm 166 is arranged distal from the first radiator arm 161. Each of the first and second vias 162, 167 further has a lower end 1622, 1672 opposite to the upper end 1621, 1671, and an intermediate section 1623, 1673 between the upper end 1621, 1671 and the lower end 1622, 1672. The first and second vias 162, 167 are respective through holes in this embodiment.

The third and fourth L-shaped structures 170, 175 further include third and fourth vias 172, 177, respectively. Each of the third and fourth vias 172, 177 extends vertically with respect to and through the upper substrate 110, the bonding film 120, the ground plane 130 and the lower substrate 140, and has a respective upper end 1721, 1771 connected electrically to a distal end 1711, 1761 of the corresponding radiator arm 171, 176, with the distal end 1711, 1761 of the corresponding radiator arm 171, 176 being distal from the reference point of the upper surface 111. That is, the distal end 1711 of the third radiator arm 171 is arranged distal from the fourth radiator arm 176, and the distal end 1761 of the fourth radiator arm 176 is arranged distal from the third radiator arm 171. Each of the third and fourth vias 172, 177 further has a lower end 1722, 1772, and an intermediate section (not labelled) between the upper end 1721, 1771 and the lower end 1722, 1772. The third and fourth vias 172, 177 are respective through holes in this embodiment. With such a configuration, the third and fourth vias 172, 177 extend from the upper surface 111 of the upper substrate 110 to a lower surface 142 of the lower substrate 140, with the lower surface 142 being opposite to an upper surface 141 of the lower substrate 140.

The upper substrate 110 has a square cross section, and has opposite first and second peripheral edges 113, 114 corresponding to the first and second L-shaped structures 160, 165, respectively, and opposite third and fourth peripheral edges 115, 116 corresponding to the third and fourth L-shaped structures 170, 175, respectively. The lower substrate 140 has a square cross section, and has opposite first and second peripheral edges 143, 144 corresponding to the first and second L-shaped structures 160, 165, respectively, and opposite third and fourth peripheral edges 145, 146 corresponding to the third and fourth L-shaped structures 170, 175, respectively. With such an arrangement, the third and fourth peripheral edges 145, 146 of the lower substrate 140 extend perpendicularly with respect to the first and second peripheral edges 113, 114 of the upper substrate 110.

The first and second feed lines 180, 185 are arranged on the lower surface 112 of the upper substrate 110, are connected electrically and respectively to the first and second vias 162, 167, and are adapted to receive the complementary components of the first differential signal. In this embodiment, each of the first and second feed lines 180, 185 extends inwardly and perpendicularly from the corresponding peripheral edge 113, 114 of the upper substrate 110 toward a reference point of the lower surface 112, has a proximal end 181, 186 connected electrically to the intermediate section 1623, 1673 of the corresponding via 162, 167, and has a distal end 182, 187 adapted to receive the respective complementary component of the first differential signal. In particular, the distal end 182, 187 is adapted to be associated operatively with a respective port for receiving the respective complementary component of the first differential signal. The reference point of the lower surface 112 intersects the central axis. In this embodiment, the port of the first feed line 180 is a negative port (Port 1−) for receiving the negative component of the first differential signal, and that of the second feed lines 185 is a positive port (Port 1+) for receiving the positive component of the first differential signal. With such a configuration, the first and second radiator arms 161, 166 are configured to cooperatively emit the first radio frequency signal having the first polarization characteristic in response to the respective components of the first differential signal respectively received by the first and second radiator arms 161, 166 via the first and second vias 162, 167 through the first and second feed lines 180, 185.

The third and fourth feed lines 190, 195 are arranged on the lower surface 142 of the lower substrate 140, are connected electrically and respectively to the third and fourth vias 172, 177, and are adapted to receive the complementary components of the second differential signal. In this embodiment, each of the third and fourth feed lines 190, 195 extends inwardly and perpendicularly from the corresponding peripheral edge 145, 146 of the lower substrate 140 toward a reference point of the lower surface 142, has a proximal end 191, 196 connected electrically to the lower end 1722, 1772 of the corresponding via 172, 177, and has a distal end 192, 197 adapted to receive the respective complementary component of the second differential signal. In particular, the distal end 192, 197 is adapted to be associated operatively with a respective port for receiving the respective complementary component of the second differential signal. The reference point of the lower substrate 142 intersects the central axis. In this embodiment, the port of the third feed line 190 is a positive port (Port 2+) for receiving the positive component of the second differential signal, and that of the fourth feed lines 195 is a negative port (Port 2−) for receiving the negative component of the second differential signal. With such a configuration, the third and fourth radiator arms 171, 176 are configured to cooperatively emit the second radio frequency signal having the second polarization characteristic in response to the respective components of the second differential signal respectively received by the third and fourth radiator arms 171, 176 via the third and fourth vias 172, 177 through the third and fourth feed lines 190, 195.

The ground plane 130 is formed with four holes 131-134 which corresponds respectively in position and size to the vias 162, 167, 172, 177 and through which the vias 162, 167, 172, 177 respectively extend. The ground plane 130 serves as a reflector to improve the front to back ratio, thereby improving broad side radiation patterns.

The impedance matching arrangement 199 includes a pair of impedance matching pads 1991, 1992 arranged on the lower surface 142 of the lower substrate 140 and operably associated with the third and fourth feed lines 190, 195.

In this embodiment, the upper substrate 110 is implemented using RT/duroid 5880 laminates made by Rogers Corporation, and has a thickness of 0.787 mm, a dielectric constant of 2.2, and a loss tangent of 0.0009. The lower substrate 140 is implemented using an RT/duroid 5880 laminates made by Rogers Corporation and has a thickness of 0.127 mm. The bonding film 120 is implemented using a piece of RO4450F made by Rogers Corporation and has a thickness of 0.01 mm.

Figure 4:
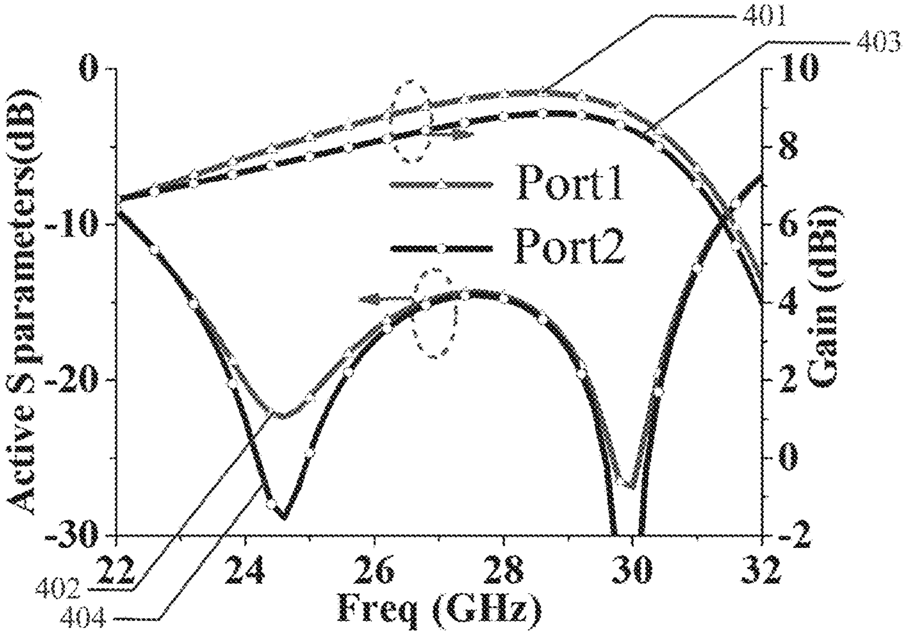
FIG. 4 depicts simulated S-parameter and gain performances of the antenna of FIG. 1 in response to each of first and second differential signals, with the first and second differential signals corresponding to first and second polarizations, respectively.

The thickness of the upper substrate 110 corresponds substantially to one-eighth of a wavelength of the upper substrate 110, g. This configuration is useful in achieving an improved bandwidth performance. FIG. 4 shows simulated S-parameter and gain performances of the antenna 100 in response to each of the first and second differential signals, with the first and second differential signals corresponding to first and second polarizations, respectively. These results are obtained through a full-wave electromagnetic simulation using Ansys HFSS. In FIG. 4. Within this figure, "Port 1" marks simulated results of the antenna 100 in respect of a first polarization in response to the first differential signal being fed through the first feed lines 180, 185, with lines 401, 402 labelling the gain and S-parameter performances in association with the first differential signal, respectively "Port 2" marks simulated results of the antenna 100 in respect of a second polarization in response to the second differential signal being fed through the second feed lines 190, 195, with lines 403, 404 labelling the gain and S-parameter performances in association with the second differential signal, respectively.

Figure 5:
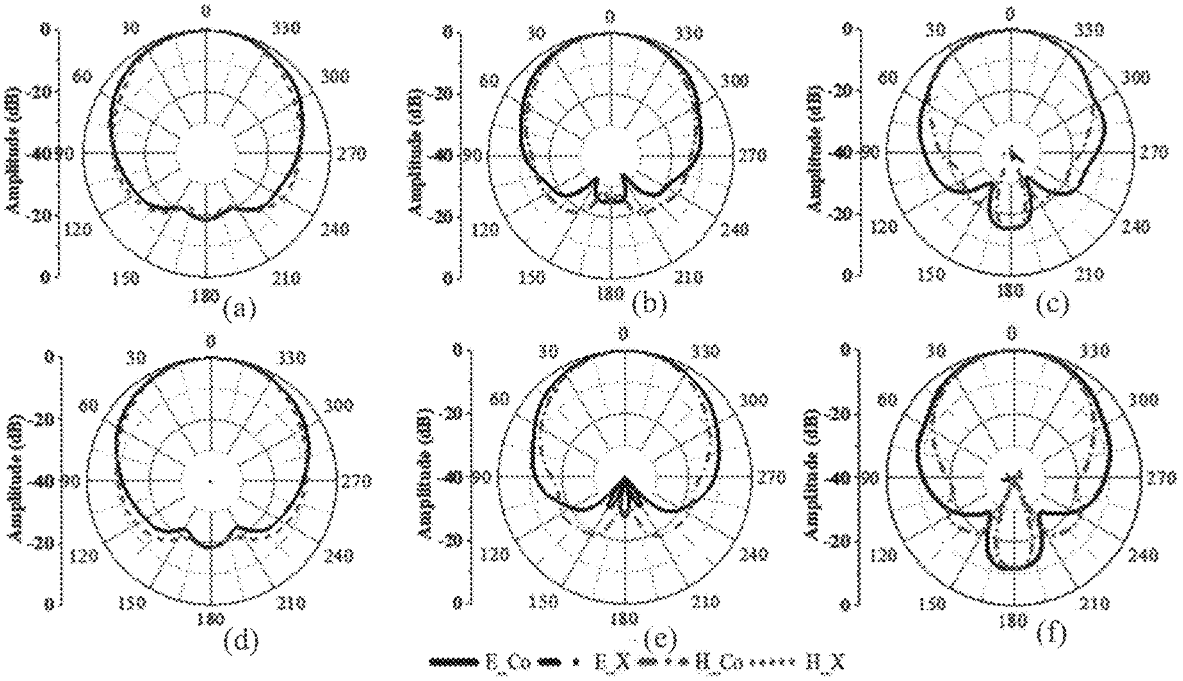
FIGS. 5*a*, 5*b*, 5*c* depict radiation patterns of the antenna of FIG. 1 at 24 GHz, 27.5 GHz and 31 GHz, respectively, in response to the first differential signal.
FIGS. 5*d*, 5*e*, 5*f* depict radiation patterns of the antenna of FIG. 1 at 24 GHz, 27.5 GHz and 31 GHz, respectively, in response to the second differential signal.

FIGS. 5*a* to 5*c* show radiation patterns of the antenna 100 at 24 GHz, 27.5 GHz and 31 GHz, respectively, in response to the first differential signal being fed through the first feed lines 180, 185. FIGS. 5*d* to 5*f* show radiation patterns of the antenna 100 at 24 GHz, 27.5 GHz and 31 GHz, respectively, in response to the second differential signal being fed through the second feed lines 190, 195. It can be understood from FIGS. 5*a* to 5*f* that the antenna 100 is able to achieve stable radiation patterns with low cross-polarization in response to each differential signal in respect of the corresponding polarization.

Moreover, instead of being formed only from the upper surface 111 to the lower surface 112 of the upper surface 110, the first and second vias 162, 167 in this embodiment are formed from the upper surface 111 of the upper substrate 110 to the lower surface 142 of the lower substrate 140, more particularly through the upper substrate 110, the bonding film 120, the ground plane 130 and the lower substrate 140. This advantageously reduces the risk of blind holes being inadvertently formed, which improves the fabrication process and the fabrication success rate.

The antenna 100 is advantageous in a number of ways. By virtue of the arrangement of the L-shaped structures 160, 165, 170, 175 with respect to the parasitic patches 151-154, the antenna 100 is able to achieve a wide bandwidth.

Further, with the antenna 100 being adapted to receive the first and second differential signals, cross-polarization is reduced, thus facilitating integration or operable association of the antenna 100 with a radio frequency (RF) circuit. The utilization of the first differential signal makes the vertial current components cancel out each other, which allows the horizontal current components of the first and second L-shaped structures 160, 165 and parasitic patches 151-154 to become dominant.

Moreover, the position arrangement of the feed lines 180, 185, 190, 195 together with the differential nature of the differential signals provide a synergy which facilitates implementation of the antenna 100 in a low-profile device as well as in a compact array. Cross polarization is reduced by the arrangement of the feed lines 180, 185, 190, 195, where the first and second feed lines 180, 185 are separated from the third and fourth feed lines 190, 195 by the ground plane 130. In addition, this particular arrangements can be adopted to construct an array antenna.

In addition, with the bonding film 120 being utilized as a part of the upper substrate 110 on which the first and second feed lines 180, 185 are placed, the antenna 100 has a thickness of only about $0.087\lambda_0$, where $\lambda_0$ is one wavelength at the center frequency of 26 GHz.

Furthermore, the ground plane 130 serves to isolate the first and second feed lines 180, 185 from the third and fourth feed lines 190, 195. This isolation arrangement, together with the differential signal arrangement, helps to improve antenna signal-to-noise ratio performances and to achieve broad side radiation patterns.

In accordance with a second aspect of the present invention, there is provided a differentially-fed dual-polarized array antenna.

Figure 6A:
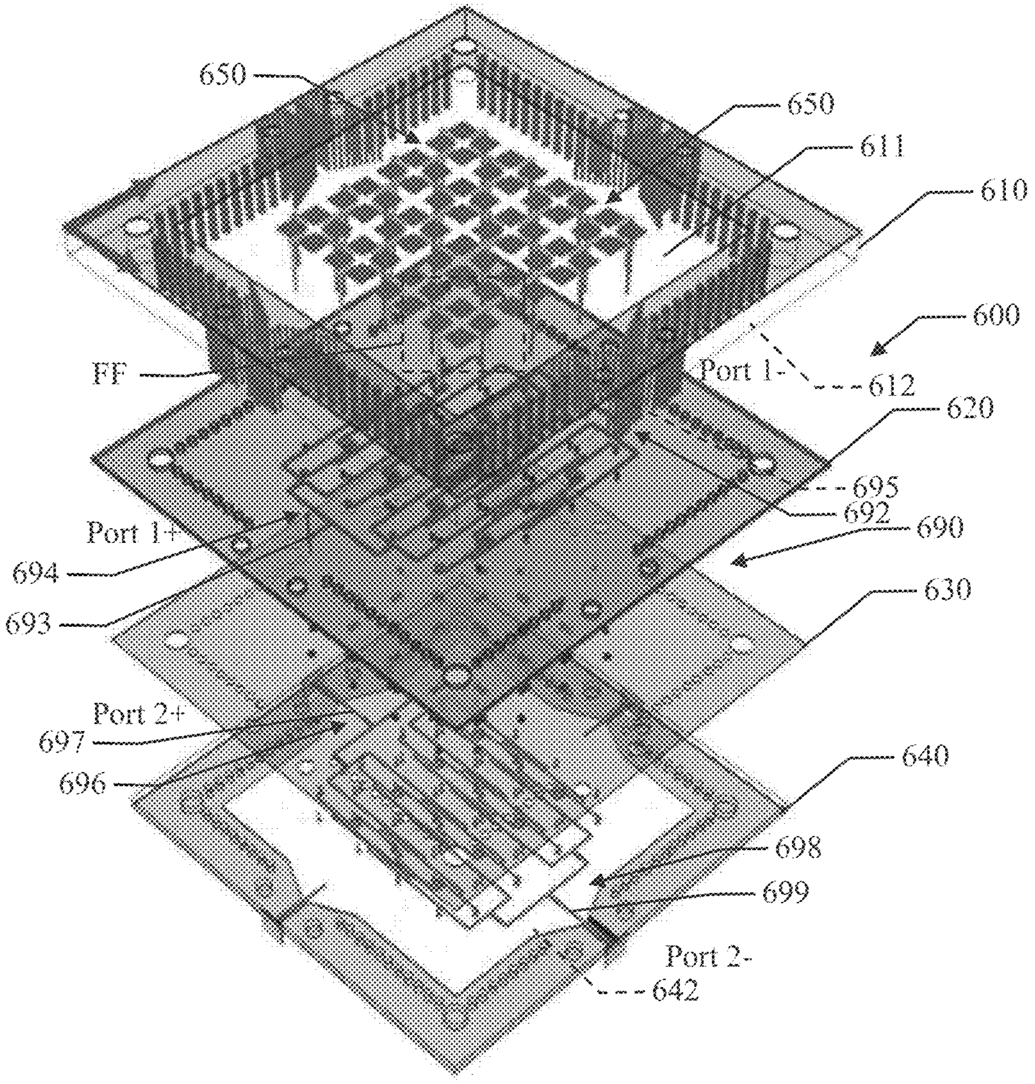
FIG. 6*a* depicts an exploded, partially transparent perspective view of a differentially-fed dual-polarized array antenna with a 4×4 array according to one embodiment of another aspect of the present invention.
Figure 6B:
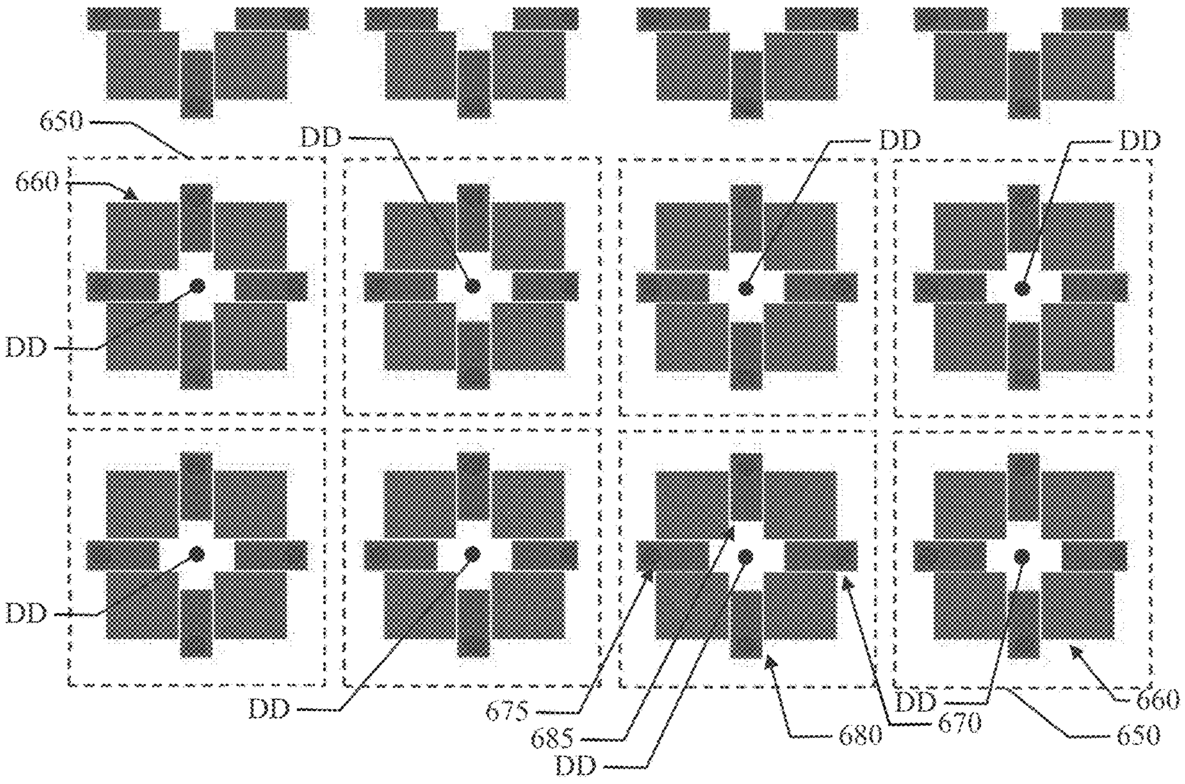
FIG. 6*b* depicts a top partial view of antenna portions of the array antenna of FIG. 6*a;*

In accordance with one embodiment of the present invention, the differentially-fed dual-polarized array antenna 600 as shown in FIGS. 6*a* and 6*b* includes an upper substrate 610, a bonding film 620, a ground plane 630, a lower substrate 640, a plurality of antenna portions 650, and a feed network 690. The feed network 690 includes first to fourth feed network segments 692, 694, 696, 698. Each of the antenna portions 650 includes a parasitic patch arrangement 660, first to fourth L-shaped structures 670, 675, 680, 685.

The upper substrate 610, the bonding film 620, the ground plane 630, and the lower substrate 640 of this embodiment are similar in configuration to the upper substrate 110, the bonding film 120, the ground plane 130, and the lower substrate 140 of the embodiment of FIGS. 1 to 3. Thus, they are omitted from description for the sake of brevity.

For each of the antenna portion 650, the parasitic patch arrangement 660 and the first to fourth L-shaped structures 670, 675, 680, 685 are similar to those 150, 160, 165, 170, 175 of the embodiment of FIGS. 1 to 3, with one exception being the arrangement of the reference point with respect to which the components 150, 170, 175, 180, 185. Specifically, in the present embodiment, for each antenna portion 650, the respective components 660, 670, 675, 680, 685 are arranged with respect to a respective reference point (marked by 'DD' in FIG. 6*b*) of an upper surface 611 of the upper substrate 610 that does not intersect a central vertical axis of the antenna 600.

Figure 6C:
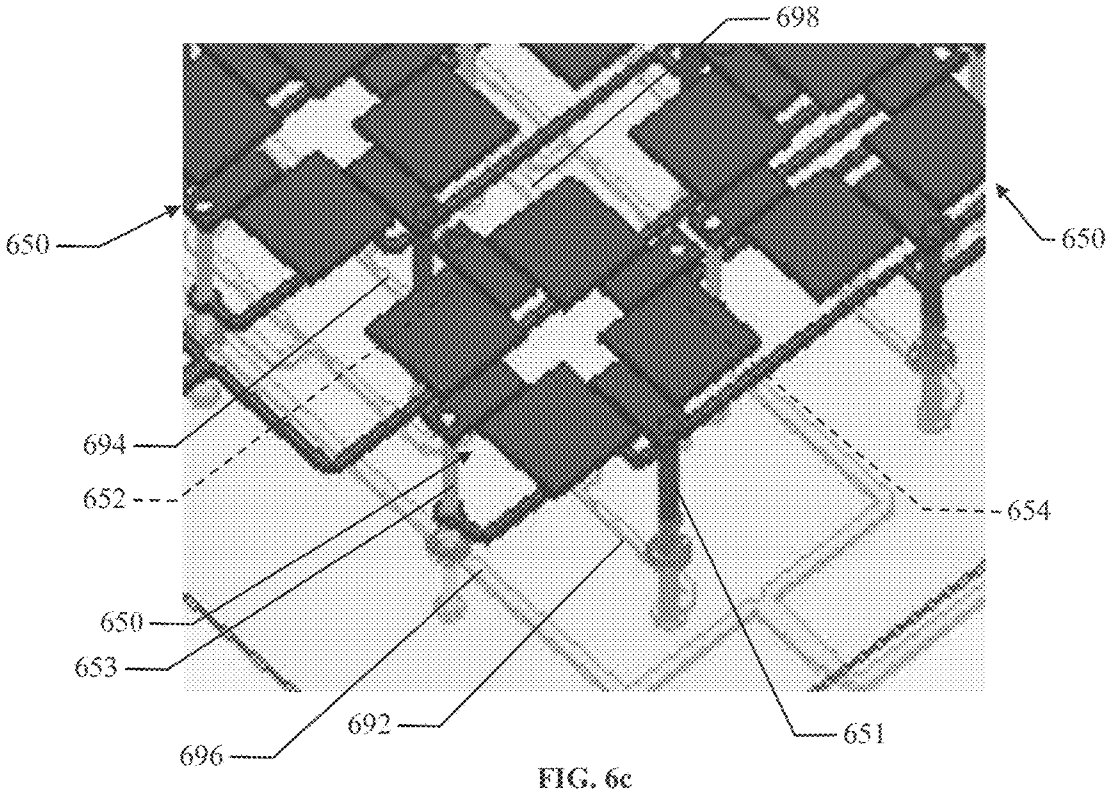
FIG. 6*c* depicts an enlarged partially transparent view of the array antenna of FIG. 6*a*, showing some antenna portions and a portion of a feed network.

FIG. 6*c* depicts an enlarged partially transparent view of the array antenna of FIG. 6*a*, showing some of the antenna portions 650 and a portion of the feed network 690. The view of FIG. 6*c* corresponds to a section of the array antenna 600 marked by dashed square 'FF' in FIG. 6*a*.

Figure 6D:
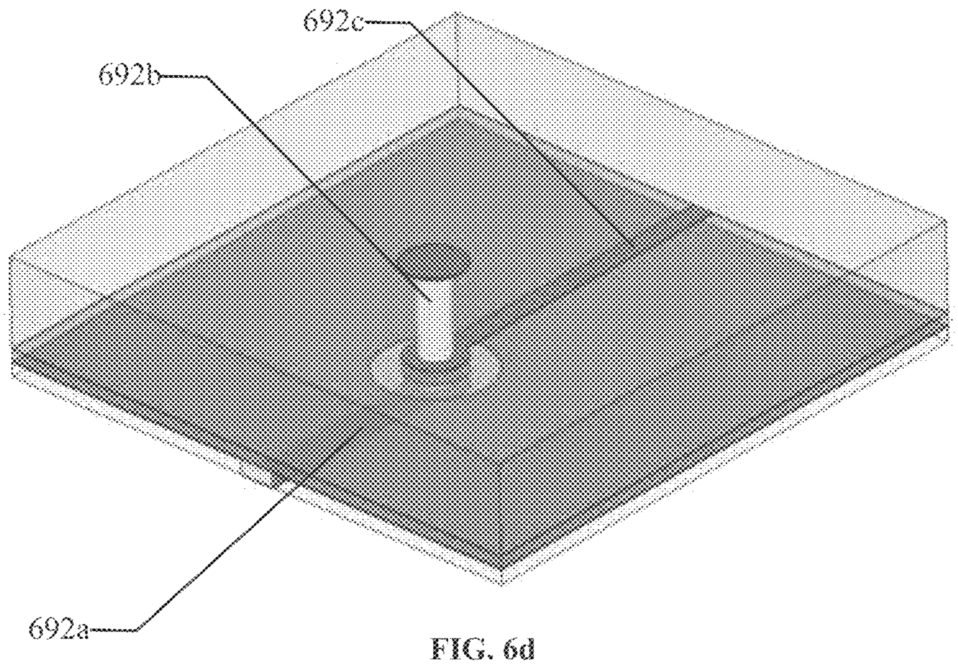
FIG. 6*d* depicts an enlarged partially transparent view of the array antenna of FIG. 6*a*, showing a feed line of the feed network.

FIG. 6*d* depicts an enlarged partially transparent view of the array antenna of FIG. 6*a*, showing a feed line 692*a* and a feed via 692*b* of the first feed network segment 692 of the feed network 690. The feed via 692*b* is adapted to electrically connect the feed line 692*a* to another feed line 692*c* (e.g., an external feed line).

The array antenna 600 of this embodiment has a 4×4 antenna array. Therefore, the reference points of the upper surface 611 and thus the respective antenna portions 650 are thus arranged in a 4×4 matrix formation in this embodiment.

The first and second feed network segments 692, 694 are arranged on a lower surface 612 of the upper substrate 610, are connected electrically and respectively to the first and second vias 651, 652 of each antenna portion 650, and are adapted to respectively receive complementary components of a first differential signal. The first and second feed network segments 692, 694 include respective feed lines 693, 695 adapted to receive the respective complementary components of the first differential signal.

The third and fourth feed network segments 696, 698 are arranged on a lower surface 642 of the lower substrate 640, are connected electrically and respectively to the third and fourth vias 653, 654 of each antenna portion 650, and are adapted to respectively receive complementary components of a second differential signal. The third and fourth feed network segments 696, 698 include respective feed lines 697, 699 adapted to receive the respective complementary components of the second differential signal. The feed lines 697, 699 are aligned in a second direction perpendicular to a first direction in which the feed lines 693, 695 are aligned.

Figure 7:
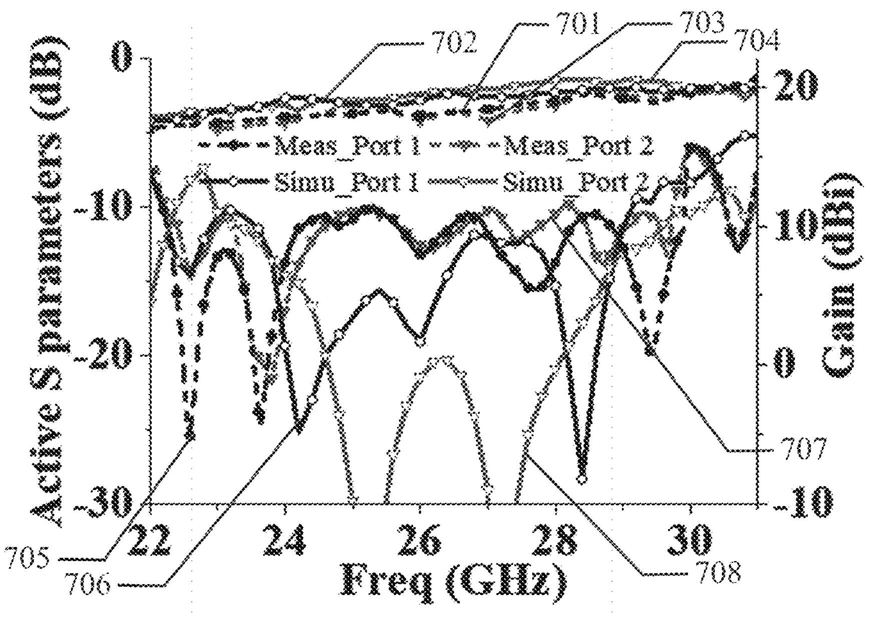
FIG. 7 depicts simulated and measured S-parameter and gain performances of the array antenna of FIG. 6*a* in response to each of first and second differential signals, with the first and second differential signals corresponding to first and second polarizations, respectively.

FIG. 7 shows simulated and measured S-parameter and gain performances of the array antenna 600 in response to each of the first and second differential signals, where lines 701, 702 respectively represent measured and simulated gain performances of the array antenna 600 in response to the first differential signal, where lines 703, 704 respectively represent measured and simulated gain performances of the array antenna 600 in response to the second differential signal, where lines 705, 706 respectively represent measured and simulated S-parameter performances of the array antenna 600 in response to the first differential signal, and where lines 707, 708 respectively represent measured and simulated S-parameter performances of the array antenna 600 in response to the second differential signal.

Figure 8:
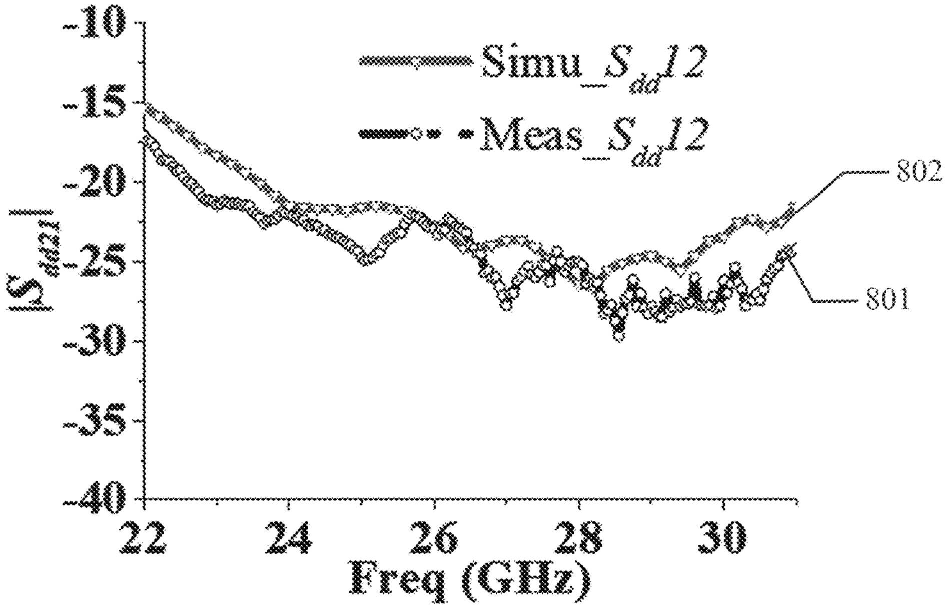
FIG. 8 depicts simulated and measured mutual coupling performances of the array antenna of FIG. 6*a;*

FIG. 8 shows mutual coupling performances of the array antenna 600, where lines 801, 802 respectively represent measured and simulated results.

Figure 9:
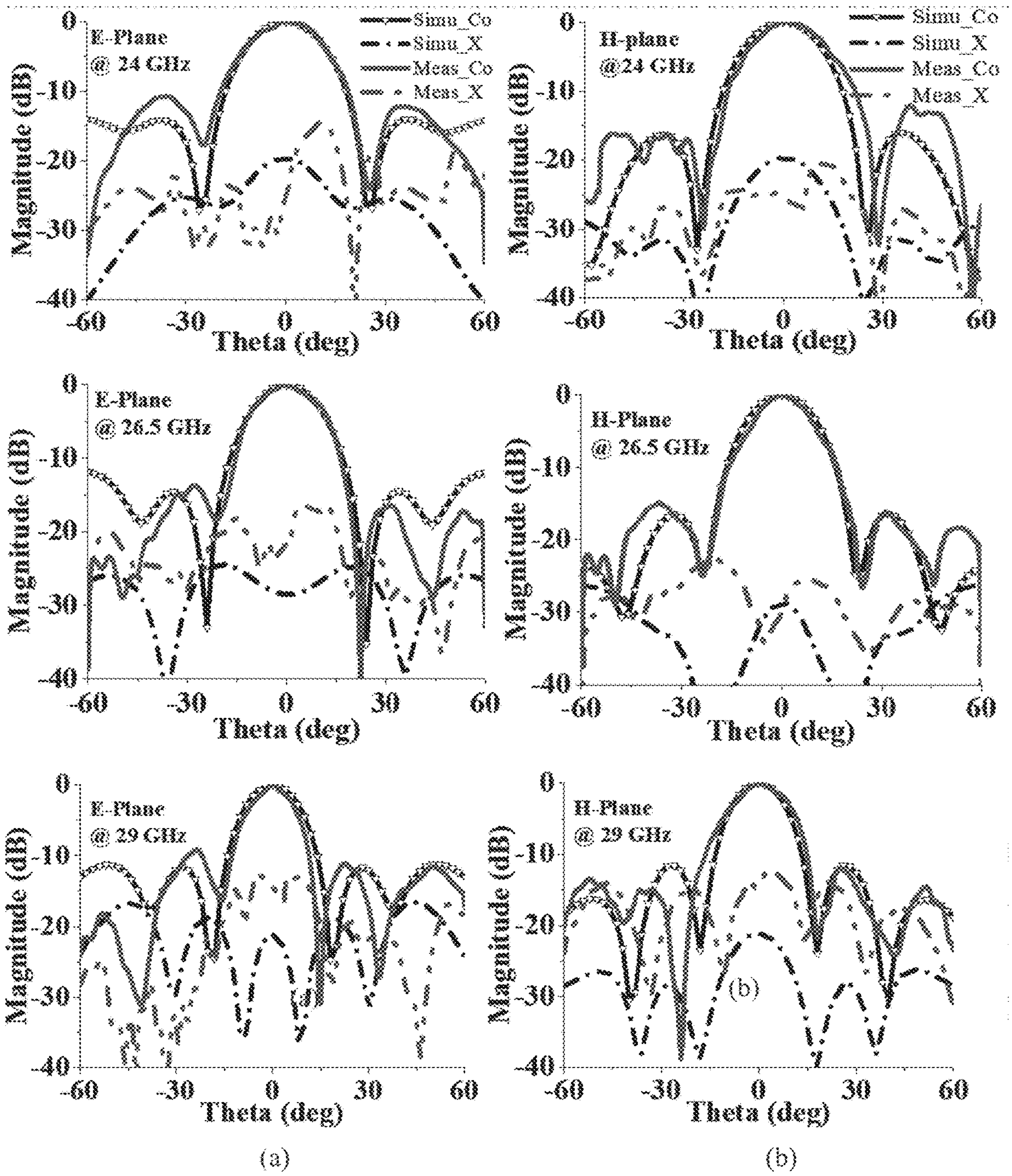
FIG. 9*a* depicts simulated and measured co-planar and cross-planar radiation patterns of the array antenna of FIG. 6*a* at 24 GHz, 26.5 GHz and 29 GHz in the first polarization (E-plane) in response to the first differential signal.
FIG. 9*b* depicts simulated and measured co-planar and cross-planar radiation patterns of the array antenna of FIG. 6*a* at 24 GHz, 26.5 GHz and 29 GHz in the second polarization (H-plane) in response to the first differential signal.
FIG. 9*c* depicts simulated and measured co-planar and cross-planar radiation patterns of the array antenna of FIG. 6*a* at 24 GHz, 26.5 GHz and 29 GHz in the first polarization (E-plane) in response to the second differential signal.
FIG. 9*d* depicts simulated and measured co-planar and cross-planar radiation patterns of the array antenna of FIG. 6*a* at 24 GHz, 26.5 GHz and 29 GHz in the second polarization (H-plane) in response to the second differential signal.
Figure 9:
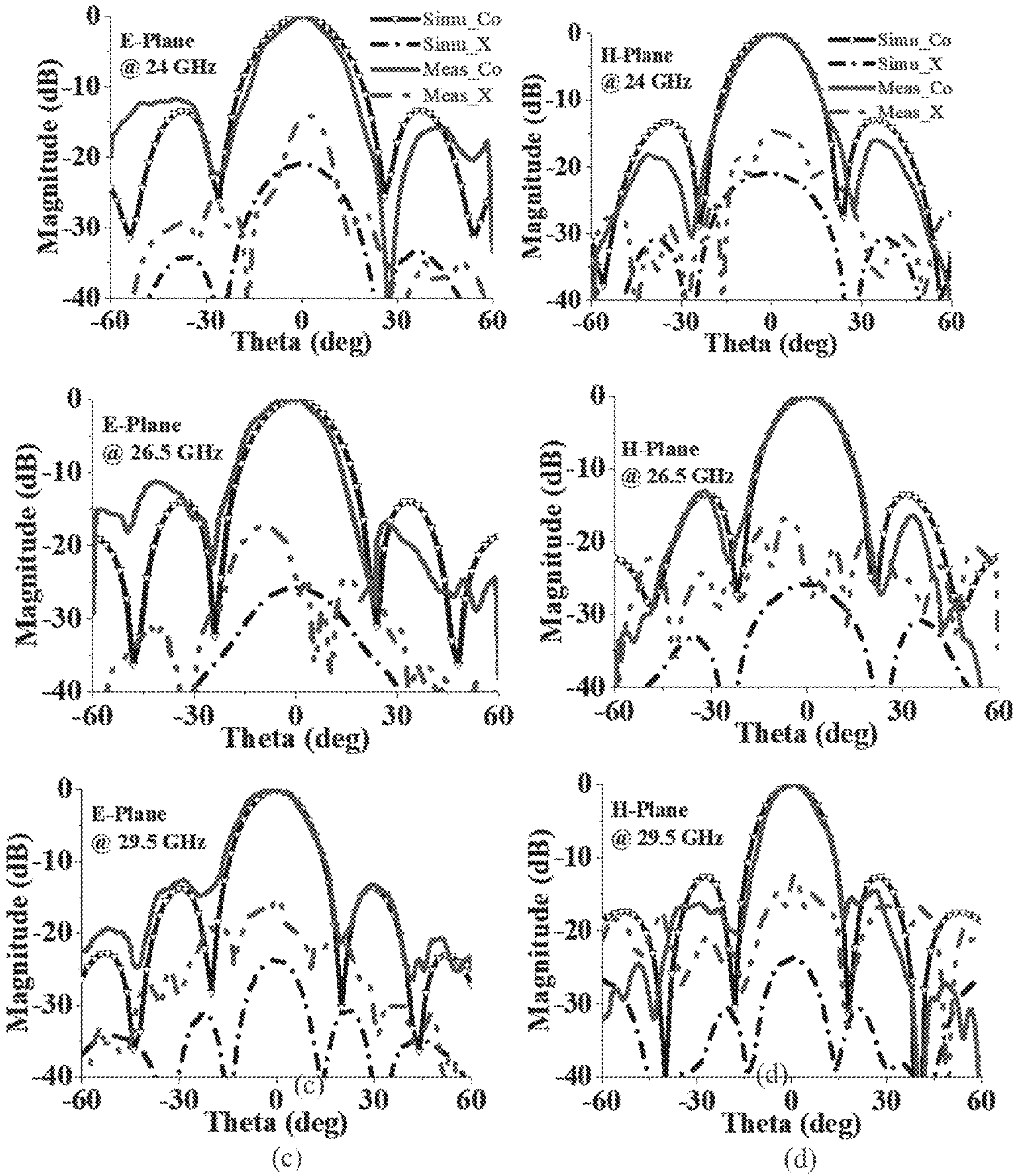

FIG. 9*a* shows simulated and measured co-planar and cross-planar radiation patterns of the array antenna 600 in response to the first differential signal at 24 GHz, 26.5 GHz and 29 GHz in respect of a first polarization (E-plane). FIG. 9*b* shows simulated and measured co-planar and cross-planar radiation patterns of the array antenna 600 in response to the first differential signal at 24 GHz, 26.5 GHz and 29 GHz in respect of a second polarization (H-plane) FIG. 9*c* shows simulated and measured co-planar and cross-planar radiation patterns of the array antenna 600 in response to the second differential signal at 24 GHz, 26.5 GHz and 29 GHz in respect of the first polarization. FIG. 9*d* shows simulated and measured co-planar and cross-planar radiation patterns of the array antenna 600 in response to the second differential signal at 24 GHz, 26.5 GHz and 29 GHz in respect of the second polarization.

For the array antenna 600, the bandwidth in one polarization overlaps that in the other polarization by 23.2% (23.2 GHz to 29.3 GHz) in the simulated results, and by 25.4% (23 GHz to 29.7 GHz) in the measured results. The feed line 693, 695 are isolated from the feed lines 697, 699 by 18 dB. Moreover, the antenna portions 650 occupy a small total area of $3.28\lambda_0 \times 3.28\lambda_0 \times 0.087\lambda_0$, where $\lambda_0$ represents a wavelength at a center frequency of the array antenna 600 (or at a center frequency of the antenna portions 650).

The array antenna 600 of this embodiment is advantageously configured to utilize mutual coupling to achieve a shared aperture effect, which is described in further detail below with reference to a 1×2 differentially-fed dual-polarized array antenna 1000 of another embodiment depicted in FIG. 10.

The array antenna 1000 is similar to the array antenna 600 in configuration, with the exception of the array antenna 1000 having no antenna portions other than left and right antenna portions 1050, 1050'. The left and right antenna portions 1050, 1050' are similar in configuration to any neighboring pair of the antenna portions 650 of the array antenna 600 in either direction. The array antenna 1000 has a substrate surface 1011. Each antenna portion 1050, 1050' includes a parasitic patch arrangement 1060, 1060', a first radiator arm 1071, 1071', a second radiator arm 1076, 1076, a third radiator arm 1081, 1081', and a fourth radiator arm 1086, 1086'. Each parasitic patch arrangement 1060, 1060' includes a first parasitic patch 1061, 1061', a second parasitic patch 1062, 1062', a third parasitic patch 1063, 1063', and a fourth parasitic patch 1064, 1064' The first radiator arm 1071 of the left antenna portion 1050 is responsive to a first one (in this embodiment, a negative component) of complementary components of a first differential signal, and the second radiator arm 1076' of the right antenna portion 1050' is responsive to a second one (in this embodiment, a positive component) of the complementary components of the first differential signal.

The first radiator arm 1071 of the left antenna portion 1050 and the second radiator arm 1076' of the right antenna portion 1050' are arranged proximate to and operably coupled with each other, and are responsive to the respective complementary components of the first differential signal to cooperatively emit a first radio frequency signal having a first polarization characteristic. In such a manner, the first antenna arm 1071 and the first and the fourth parasitic patches 1061, 1064 of die left antenna portion 1050, together with the second antenna arm 1076' and the second and third parasitic patches 1062', 1063' of the right antenna portion 1050' cooperate to provide or serve as a further antenna portion 1050". The further antenna portion 1050" corresponds to an aperture portion characterized by mutual coupling between the left and right antenna portions 1050, 1050'. By configuring the antenna portions 1050, 1050' in the manner described above, said mutual coupling is utilized to realize the shared-aperture effect. That is, with the antenna array 1000, the antenna portions 1050, 1050' are arranged sufficiently close to each other to utilize mutual coupling therebetween to achieve the shared-aperture effect. By virtue of the proximity in placement of the antenna portions 1050, 1050', the antenna array 1000 is thus advantageous in that the antenna portions 1050, 1050' occupy a small total area of $0.64\lambda_0$ while gain is largely maintained.

Figure 11:
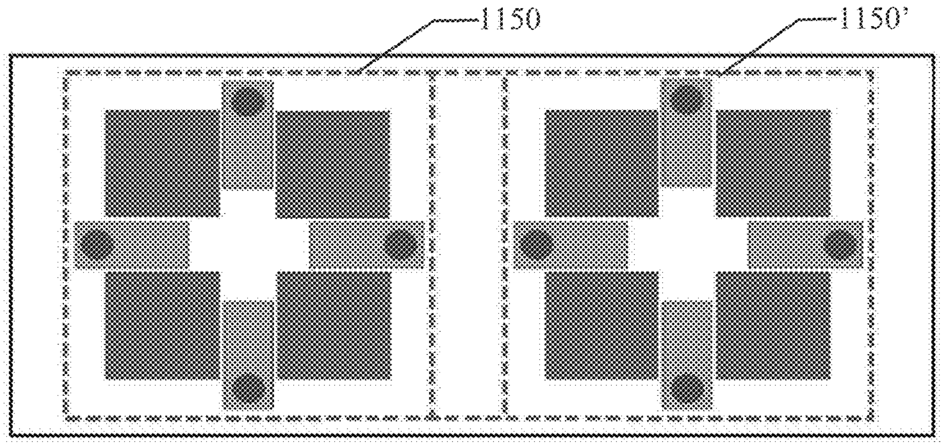
FIG. 11 depicts a top view of an array antenna arrangement with a 1×2 array in a configuration different from that of FIG. 10.
Figure 12:
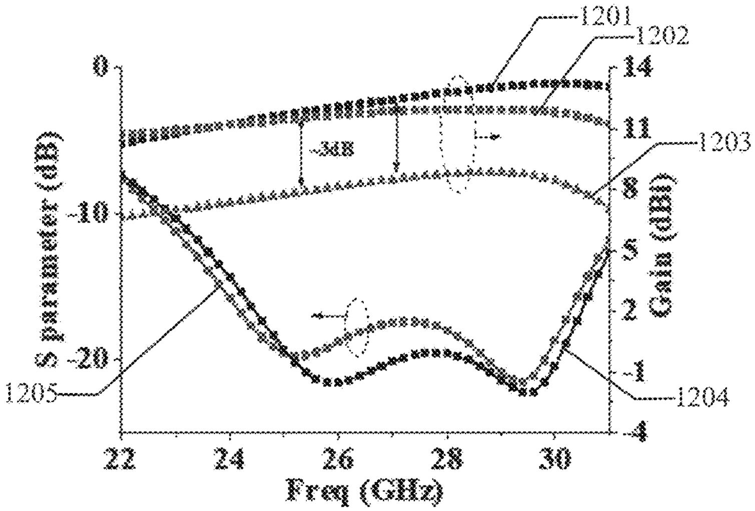
FIG. 12 depicts S-parameter and gain performances of each of the array antenna arrangement of FIG. 10, that of FIG. 11, and the antenna of FIG. 1.

In contrast with a similar array antenna 1100 shown in FIG. 11 whose left and right antenna portions 1150, 1150' have respective center points spaced apart by a greater distance of $0.92\lambda_0$ (for avoiding severe mutual coupling), the array antenna 1000 whose left and right portions 1050, 1050' have respective center points spaced apart by a smaller distance of $0.71\lambda_0$ is able to achieve a better S-parameter performance, as shown in FIG. 12.

In FIG. 12, first, second and third lines 1201, 1202, 1203 show gain performances of the array antenna 1000, the array antenna 1100 and a non-array antenna (i.e., having a single antenna portion, similar to the embodiment of FIG. 1 to 3), respectively; and fourth and fifth lines 1204, 1205 show S-parameter performances of the array antenna 1000 and the array antenna 1100, respectively. It can be seen that, despite the distance between the center points of the antenna portions 1050, 1050' being significantly smaller, the array antenna 1000 is able to achieve gain and S-parameter performances similar to those achieved by the array antenna 1100. Moreover, the array antenna 1000 is shown to achieve an improvement of 3 dB in gain performance relative to the non-array antenna.

Figure 13:
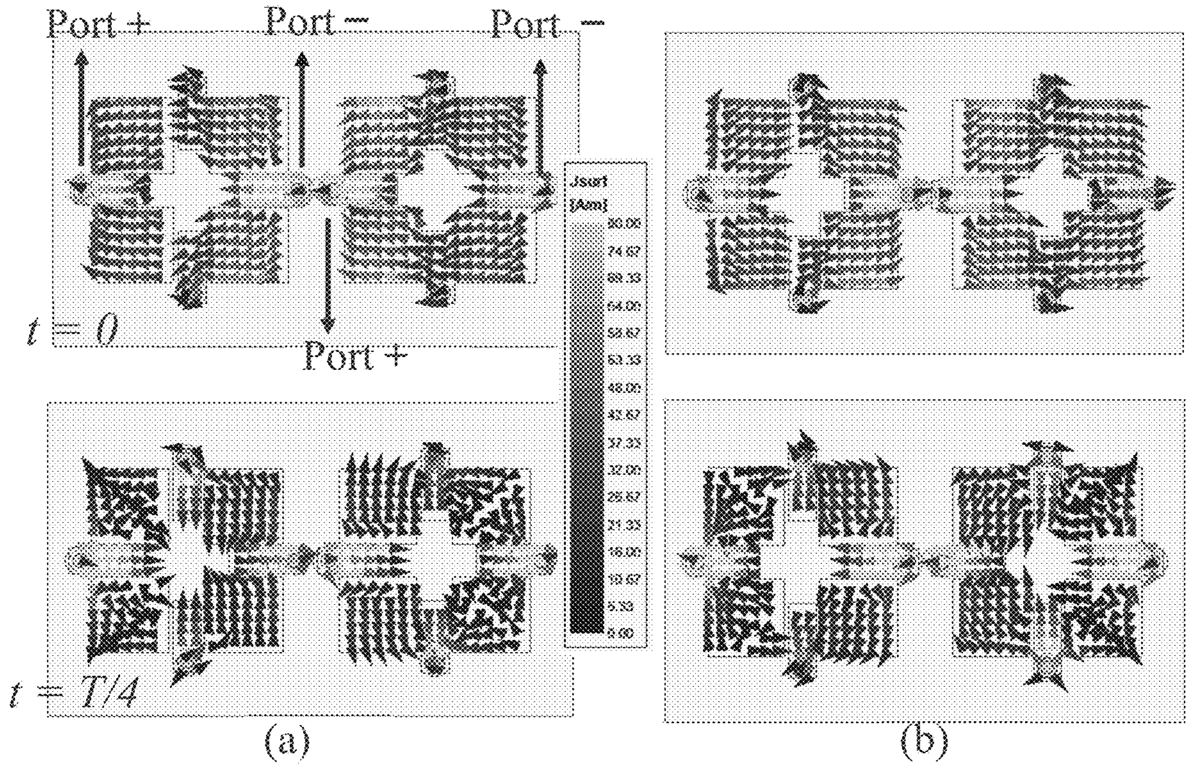
FIGS. 13*a, b* depict current distributions of the array antenna arrangement of FIG. 10 at 24 GHz and 29 GHz, respectively.

FIG. 13 shows in-phase current distribution measurements of the array antenna 1000 at 24 GHz and 29 GHz in respect of two time points, namely t=0 and t=T/4, where T represents one period of time-harmonic excitation. The effect of mutual coupling in the array antenna 1000 can be observed in this figure.

Figure 10:
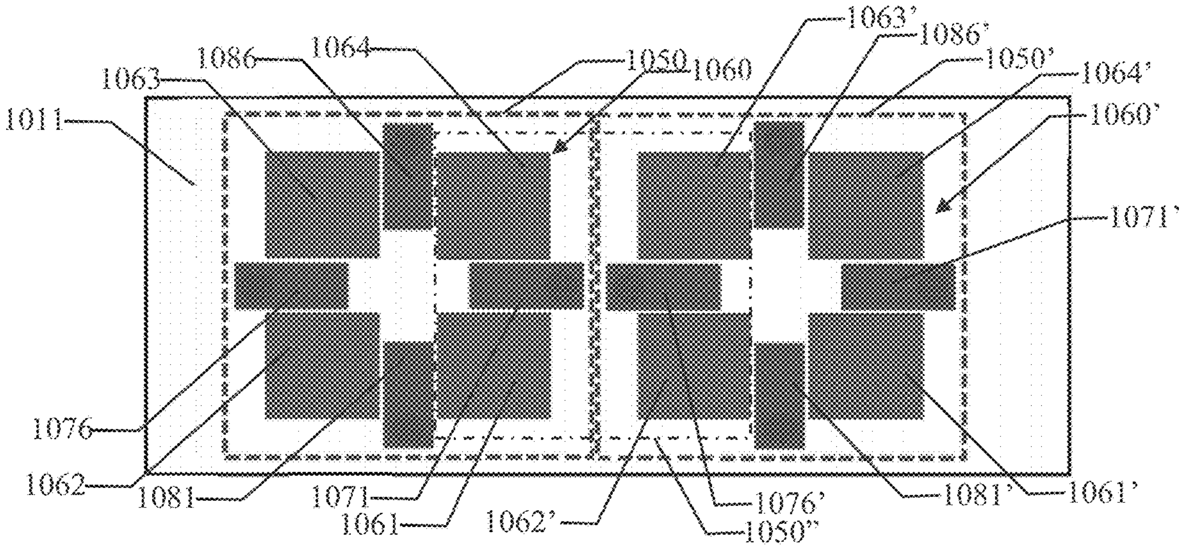
FIG. 10 depicts a top view of an array antenna arrangement with a 1×2 array according to one embodiment of yet another aspect of the present invention.
Figure 14:
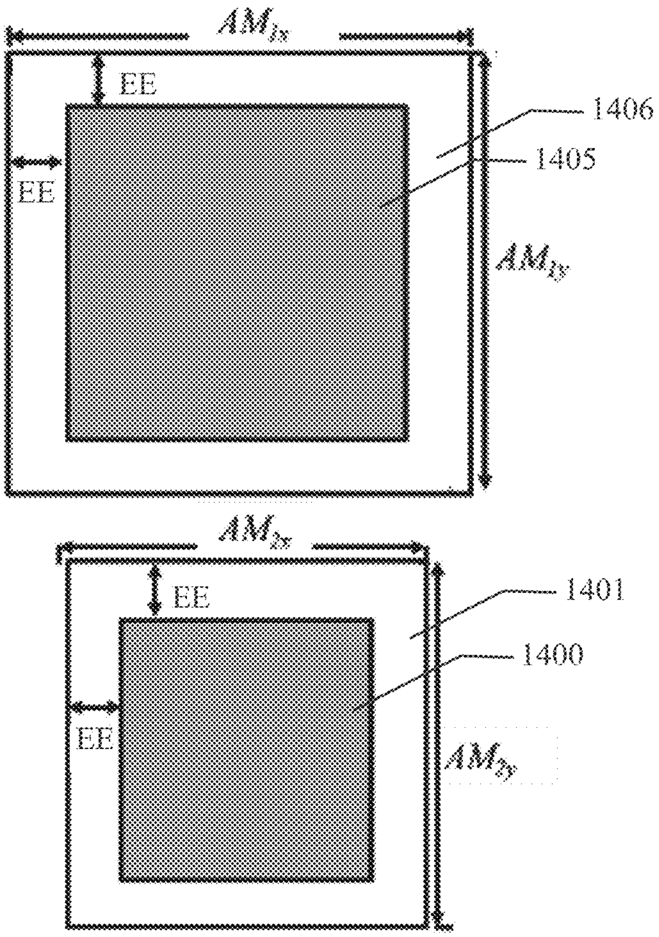
FIG. 14 depicts two areas occupied by respective 4×4 arrays, with the array of the upper larger area implemented according to the array antenna arrangement of FIG. 11, and with that of the lower smaller area implemented according to the array antenna arrangement of FIG. 10.

FIG. 14 shows a side-by-side comparison between two array area 1400, 1405 occupied by respective 4×4 arrays, with the array of the lower area 1400 implemented according to the arrangement of FIG. 10 and with the array of the upper area 1405 implemented according to the arrangement of FIG. 11. As can be seen from FIG. 14, the upper array area 1405 is significantly larger than the lower array area 1400. It can thus be understood that mutual coupling can be utilized in the manner of the array antenna 1000 to achieve a significantly reduced array size yet maintained gain. Each of the array areas 1400, 1405 is shown to be surrounded by a respective peripheral area 1401, 1406, which marks a border between the respective array and an adjacent array for ensuring optimal antenna performance of both arrays. A width of the peripheral area 1401, 1406 (marked by 'EE') can be adjusted to improve performances of the respective array.

Figure 15:
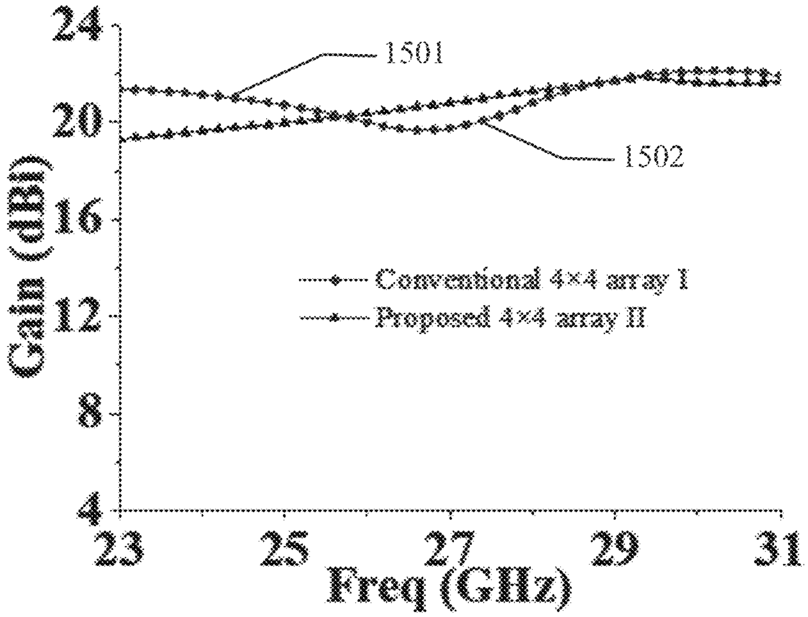
FIG. 15 depicts respective simulated array gain results of the 4×4 arrays of FIG. 14.

FIG. 15 shows simulated array gain results of the array antennas of the array areas 1400, 1405, respectively, where first and second connected lines 1501, 1502 correspond to the array antennas of the array areas 1400, 1405, respectively. It can be seen that the array antennas of the array areas 1400, 1405 have similar gain performances, especially across the frequencies from 24 GHz to 31 GHz. Yet, the array occupying the lower array area 1400 is 36% smaller in size than that occupying the upper array area 1405.

It can be understood that the 4×4 array antenna 600 is an expanded version of the 1×2 array antenna 1000, with each adjacent pair of the antenna portions 650 in either direction being configured in accordance with the arrangement of the 1×2 array antenna 1000 to achieve a respective shared aperture effect.

Advantageously, the differentially-fed dual-polarized antenna 100 and the differentially-fed dual-polarized array antennas 600, 1000 are able to achieve wide bandwidths, stable radiation patterns and gains, low cross-polarization levels and low profiles (or array areas, only $0.073\lambda_0$). In addition, by employing a feed configuration similar to that of the antenna 100 (i.e., the vias 162, 167, 172, 177, the feed lines 180, 185 on the lower surface 112, and the feed lines 190, 195 on the lower surface 142), the antenna portions 650 of the array antenna 600 can be tightly arranged. Moreover, the array antennas 600, 1000 utilize mutual coupling between neighboring pairs of the antenna portions 650, 1050, 1050' together with the differentially-fed (or differentially-driven) arrangement, contributes to a compact design of, for example, $3.28\lambda_0 \times 3.28\lambda_0 \times 0.08\lambda_0$ ($\lambda_0$ representing the wavelength in free space at 26.3 GHz) with an overlapped bandwidth of 25%, a peak gain of about 19.8 dBi, a good port (or feed line)isolation, and largely maintains gain. The antenna 100 and the array antennas 600, 1000 are thus suitable for use in 5G communications systems and other such systems requiring low-profile, compact antenna designs. Additionally, the differentially-fed arrangement makes the antennas 100, 600, 100 suitable for RF circuit integration.

Other alternative arrangements are described below.

In some alternative embodiments similar to the embodiment of FIGS. 1 to 3, the first and second vias 162, 167 of the first and second L-shaped structures 160, 165 extend through only the upper substrate 110, from the upper surface 111 to the lower surface 112. That is, the first and second vias 162, 167 do not extend beyond the upper substrate 110.

In some alternative embodiments, each radiator arm is arranged with respect to the respective via in a T-shaped configuration. That is, the respective via is connected electrically to a middle section of the radiator arm.

In some alternative embodiments, the bonding film may be otherwise configured (e.g., with different materials), provided that the thickness of the bonding film is suitable, that the bonding film has a suitable dielectric constant, and that the feed lines do not exceed predetermined processing limitations.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A differentially-fed dual-polarized antenna comprising:

an upper substrate and a lower substrate;

a bonding film bonding the upper substrate to the lower substrate;

a ground plane arranged between the bonding film and the lower substrate;

a parasitic patch arrangement arranged on an upper surface of the upper substrate;

first and second radiator arms arranged on the upper surface of the upper substrate, operably coupled with the parasitic patch arrangement, spaced apart by a first gap, and responsive respectively to complementary components of a first differential signal to emit a first radio frequency signal having a first polarization characteristic;

first and second vias extending from the upper surface of the upper substrate to a lower surface of the upper substrate, the first via connected electrically to a distal end of the first radiator arm distal from the second radiator arm, the second via connected electrically to a distal end of the second radiator arm distal from the first radiator arm;

first and second feed lines arranged on the lower surface of the upper substrate, connected electrically and respectively to the first and second vias, and adapted to respectively receive the complementary components of the first differential signal;

third and fourth radiator arms arranged on the upper surface of the upper substrate, operably coupled with the parasitic patch arrangement, spaced apart by a second gap intersecting the first gap, and responsive respectively to complementary components of a second differential signal to emit a second radio frequency signal having a second polarization characteristic orthogonal to the first polarization characteristic;

third and fourth vias extending from the upper surface of the upper substrate to a lower surface of the lower substrate, the third via connected electrically to a distal end of the third radiator arm distal from the fourth radiator arm, the fourth via connected electrically to a distal end of the fourth radiator arm distal from the third radiator arm, and third and fourth feed lines arranged on the lower surface of the lower substrate, connected electrically and respectively to the third and fourth vias, and adapted to respectively receive the complementary components of the second differential signal.

2. The differentially-fed dual-polarized antenna of claim 1, wherein the parasitic patch arrangement includes four parasitic patches arranged in a matrix formation.

3. The differentially-fed dual-polarized antenna of claim 2, wherein each of the radiator arms is interposed between a respective pair of the parasitic patches.

4. The differentially-fed dual-polarized antenna of claim 3, wherein the radiator arms extend radially and outwardly with respect to a center point of the matrix formation.

5. The differentially-fed dual-polarized antenna of claim 4, wherein each of the radiator arms extends longitudinally beyond the respective pair of the parasitic patches.

6. The differentially-fed dual-polarized antenna of claim 1, wherein the first and second vias further extend from the lower surface of the upper substrate to the lower surface of the lower substrate.

7. The differentially-fed dual-polarized antenna of claim 1, wherein the first and second feed lines extend inwardly and respectively from opposite peripheral edges of the upper substrate, wherein the third and fourth feed lines extend inwardly and respectively from opposite peripheral edges of the lower substrate.

8. The differentially-fed dual-polarized antenna of claim 7, wherein the opposite peripheral edges of the lower substrate extend perpendicularly with respect to the opposite peripheral edges of the upper substrate.

9. The differentially-fed dual-polarized antenna of claim 8, wherein the first and second feed lines further extend perpendicularly and respectively from the respective peripheral edges of the upper substrate, wherein the third and fourth feed lines further extend perpendicularly and respectively from the respective peripheral edges of the lower substrate.

10. The differentially-fed dual-polarized antenna of claim 1, wherein the feed lines are respective microstrip lines.

11. The differentially-fed dual-polarized antenna of claim 1, wherein the complementary components of each of the first and second differential signals are out of phase with respect to each other.

12. The differentially-fed dual-polarized antenna of claim 1, further comprising:

an impedance matching arrangement arranged on the lower surface of the lower substrate and operably associated with the third and fourth feed lines.

13. The differentially-fed dual-polarized antenna of claim 1, wherein the differentially-fed dual-polarized antenna has a thickness of $0.087\lambda_0$, where $\lambda_0$ represents a wavelength at a center frequency of the differentially-fed dual-polarized antenna.

14. A differentially-fed dual-polarized array antenna comprising:

an upper substrate and a lower substrate;

a bonding film bonding the upper substrate to the lower substrate;

a ground plane arranged between the bonding film and the lower substrate;

a plurality of antenna portions each including:

a parasitic patch arrangement arranged on an upper surface of the upper substrate, first and second radiator arms arranged on the upper surface of the upper substrate, operably coupled with the parasitic patch arrangement, spaced apart by a first gap, and responsive respectively to complementary components of a first differential signal to emit a first radio frequency signal having a first polarization characteristic, first and second vias extending from the upper surface of the upper substrate to a lower surface of the upper substrate, the first via connected electrically to a distal end of the first radiator arm distal from the second radiator arm, the second via connected electrically to a distal end of the second radiator arm distal from the first radiator arm;

third and fourth radiator arms arranged on the upper surface of the upper substrate, operably coupled with the parasitic patch arrangement, spaced apart by a second gap intersecting the first gap, and responsive respectively to complementary components of a second differential signal to emit a second radio frequency signal having a second polarization characteristic orthogonal to the first polarization characteristic; and third and fourth vias extending from the upper surface of the upper substrate to a lower surface of the lower substrate, the third via connected electrically to a distal end of the third radiator arm distal from the fourth radiator arm, the fourth via connected electrically to a distal end of the fourth radiator arm distal from the third radiator arm;

first and second feed network segments arranged on the lower surface of the upper substrate, connected electrically and respectively to the first and second vias of each antenna portion, and adapted to respectively receive the complementary components of the first differential signal; and third and fourth feed network segments arranged on the lower surface of the lower substrate, connected electrically and respectively to the third and fourth vias of each antenna portion, and adapted to respectively receive the complementary components of the second differential signal.

15. The differentially-fed dual-polarized array antenna of claim 14, wherein the first radiator arm of one of the antenna portions and the second radiator arm of a neighboring one of the antenna portions are arranged proximate to and operably coupled with each other, and are responsive to the respective complementary components of the first differential signal to emit the first radio frequency signal.

16. The differentially-fed dual-polarized array antenna of claim 15, wherein the first radiator arm and an operably associated section of the parasitic patch arrangement of said one of the antenna portions cooperate with the second radiator arm and an operably associated section of the parasitic patch arrangement of the neighboring one of the antenna portions to serve as a further antenna portion corresponding to the first radio frequency signal.

17. The differentially-fed dual-polarized array antenna of claim 16, wherein the associated section of the parasitic patch arrangement of said one of the antenna portions includes two parasitic patches between which the respective first radiator arm is arranged, wherein the associated section of the parasitic patch arrangement of the neighboring one of the antenna portions includes two parasitic patches between which the respective second radiator arm is arranged.

18. The differentially-fed dual-polarized array antenna of claim 14, wherein each neighboring pair of the antenna portions have respective center points spaced apart from each other by $0.71\lambda_0$, where $\lambda_0$ represents a wavelength at a center frequency of the antenna portions.

19. An array antenna arrangement comprising:

a substrate surface; and first and second antenna portions each including:

a parasitic patch arrangement arranged on the substrate surface;

first and second radiator arms arranged on the substrate surface, operably coupled with the parasitic patch arrangement, spaced apart by a first gap, and responsive respectively to complementary components of a first differential signal to emit a first radio frequency signal having a first polarization characteristic; and third and fourth radiator arms arranged on the substrate surface, operably coupled with the parasitic patch arrangement, spaced apart by a second gap intersecting the first gap, and responsive respectively to complementary components of a second differential signal to emit a second radio frequency signal having a second polarization characteristic orthogonal to the first polarization characteristic;

the first radiator arm of the first antenna portion and the second radiator arm of the second antenna portion being arranged proximate to and operably coupled with each other, and being responsive to the respective complementary components of the first differential signal to emit the first radio frequency signal.

* * * * *